(12) United States Patent
Bell, III

(10) Patent No.: US 8,240,529 B1
(45) Date of Patent: Aug. 14, 2012

(54) COLLAPSIBLE HITCH MOUNTED CARGO CARRIER

(76) Inventor: Randall Ray Bell, III, Pensacola, FL (US)

( * ) Notice: Subject to any disclaimer, the term of this patent is extended or adjusted under 35 U.S.C. 154(b) by 400 days.

(21) Appl. No.: 12/655,803

(22) Filed: Jan. 8, 2010

(51) Int. Cl.
*B60R 9/06* (2006.01)
(52) U.S. Cl. ......... 224/497; 224/503; 224/519; 224/532
(58) Field of Classification Search .......... 224/497–499, 224/502–503, 519, 525, 532; 280/401, 491.4, 280/639; 211/196–197, 203, 205; 135/144, 135/148, 151
See application file for complete search history.

(56) References Cited

U.S. PATENT DOCUMENTS

| | | | | |
|---|---|---|---|---|
| 1,625,808 A | * | 4/1927 | Hyde | ............................ 224/498 |
| 1,712,836 A | | 5/1929 | Mills | |
| 1,941,860 A | * | 1/1934 | Hanson | ......................... 224/498 |
| 3,163,339 A | | 12/1964 | Merchant | |
| 3,207,396 A | * | 9/1965 | Mundell et al. | ............... 224/513 |
| 3,913,811 A | | 10/1975 | Spencer | |
| 5,232,134 A | * | 8/1993 | Allen | ............................ 224/521 |
| 5,280,841 A | * | 1/1994 | Van Deursen | ................ 211/197 |
| 5,449,075 A | * | 9/1995 | Meade et al. | .................. 211/197 |
| 6,382,486 B1 | | 5/2002 | Kretchman et al. | |
| 6,712,248 B2 | | 3/2004 | Mitchell | |
| RE38,766 E | | 8/2005 | Karlsson | |
| 7,246,733 B2 | * | 7/2007 | Threet et al. | ................... 224/498 |
| 7,316,339 B2 | | 1/2008 | Zhang | |
| 8,061,571 B2 | * | 11/2011 | Aghajanian | .................... 224/499 |
| 8,087,559 B2 | * | 1/2012 | Medina et al. | ................. 224/497 |
| 2007/0175938 A1 | * | 8/2007 | Swenson | ........................ 224/498 |
| 2008/0087699 A1 | * | 4/2008 | Zhang | ............................ 224/519 |
| 2008/0099522 A1 | * | 5/2008 | Clausen et al. | ............... 224/519 |

* cited by examiner

*Primary Examiner* — Justin Larson
*Assistant Examiner* — John Cogill
(74) *Attorney, Agent, or Firm* — Peter Loffler

(57) ABSTRACT

A cargo carrier removably attaches to a square hitch receiver on the back of a vehicle. The cargo carrier is collapsible when not in use. A base plate has a series of first arms pivotally attached thereto each first arm extending outwardly for use and secured thereat and folding upwardly for storage. A removable plate secures the first arms in the extended position. A second arm is attached to an outer end of a first arm and pivots between an extended position extending upwardly from the first arm and a collapsed position flush against the first arm. Each second arm is lockable in its extended position. A flexible cable is attached to the distal end of each second arm to help retain cargo within the device.

19 Claims, 8 Drawing Sheets

COLLAPSIBLE HITCH MOUNTED CARGO CARRIER

BACKGROUND OF THE INVENTION

1. Field of the Invention

The present invention relates to a cargo carrier that attaches to the hitch on the rear of a vehicle wherein the carrier collapses to a relatively compact form when not in use.

2. Background of the Prior Art

No matter how big the SUV or pickup truck and how well it is packed, it seems that there is never enough room for all the people and gear to be transported. Whether a person is going tailgating, hunting or to the beach, there is always more cargo for the vehicle than there is cargo space on the vehicle. To address this situation, some people simply load up the excess gear on top of the vehicle and tie the cargo down. This storage method works reasonably well if the vehicle is equipped with a roof rack designed for such loads, not as well if the vehicle is not so equipped. However, the cargo on the roof creates substantial additional drag while driving, decreasing both the handling of the vehicle as well as the gas mileage obtained by the vehicle. Additionally, loading and unloading the cargo can be challenging and time-consuming especially if the vehicle has a relatively high roof line.

Others have proposed cargo carriers that are connected to the square hitch located at the rear of the vehicle. Such devices, which come in varying architectures from the relatively simple to the elaborate and complex, typically use a frame onto which cargo is loaded, with the frame having a hitch attachment arm thereon that fastenably couples to the square hitch of the vehicle. The cargo rides behind the tailgate of the vehicle out of the main wind stream so as not to have an unduly adverse effect on vehicle performance, either in handling or gas mileage. As the cargo carrier and its loaded cargo are located by the tailgate, access to the cargo so loaded is not problematic even for relatively short people. While rear hitch attached cargo carriers offer a practical solution for excess cargo to be transported by a truck or SUV, or even a car equipped with a hitch at its rear, such systems are not without shortcomings.

While cargo carriers hold a substantial amount of cargo for their size, the carriers tend to be large and somewhat difficult to maneuver when not in use. They are also awkward to transport when not in use carrying cargo. For example, a cargo carrier is used to go to a tailgate party in order to transport the food and beer to the game. At the tailgate party the food and beer are consumed so that the cargo carrier is not needed for the return trip. The size of the carrier often makes placing the carrier into the vehicle for the return trip difficult as the remainder of the passengers and cargo are still present inside. As such, the carrier remains attached to the hitch of the vehicle for the return trip. While not problematic for the driver of the vehicle, many such carriers, when empty and due to their low profile are difficult to see by other drivers. Placement of an orange flag onto the carrier helps somewhat, but since the carrier is so low on the vehicle, even the flag is not always noticed by other drivers. This can result into another driving into the carrier especially if the carrier holding vehicle spends a lot of time in city traffic. Additionally, such carriers take up a lot of storage room when not in use, which storage room may not be in great supply.

What is needed is a cargo carrier that is removably attachable to a typical hitch of a vehicle wherein such carrier can carry a load of cargo external of the vehicle without causing undue aerodynamic drag onto the vehicle. Such a carrier must be of sufficient size so as to be able to carry a substantial load with ease yet be relatively small when not in use so as to be easily transported and stored. Ideally, such a carrier is relatively simple in design and construction so as to be readily affordable to a wide segment of potential consumers for this type of product.

SUMMARY OF THE INVENTION

The collapsible hitch mounted cargo carrier of the present invention addresses the aforementioned needs in the art by providing a cargo carrier that removably attaches to a hitch of a vehicle in the usual way and holds a load of cargo thereon, the load being located substantially behind the tailgate of the vehicle (or rear deck of a regular passenger vehicle) so that the invention and its held cargo do not substantially adversely affect the aerodynamic profile of the vehicle. The collapsible hitch mounted cargo carrier is capable of holding a substantial load thereon yet is relatively compact in configuration for transport when not in use and for storage purposes. The collapsible hitch mounted cargo carrier is of relatively simple design and construction and is made using standard manufacturing techniques. As a result the collapsible hitch mounted cargo carrier is relatively inexpensive to manufacture so that the device is readily affordable to a large portion of potential customers for this type of product. Use and maintenance of the hitch mounted cargo carrier is relatively simple and straightforward.

The collapsible hitch mounted cargo carrier of the present invention is comprised of a base plate that has an upper surface and a lower surface. A hitch arm is removably attached to the lower surface of the base plate. A plurality of securement pins extend upwardly from the upper surface of the base plate. A plurality of first arms, each having a first end and an opposing second end, are each pivotally attached to the upper surface of the base plate at the first end thereof. Each first arm is capable of pivoting between a first extended position wherein the first arm extends radially outwardly from the base plate and where each securement pin is received within at least one opening located on the first arm and a first collapsed position wherein the first arm extends upwardly from the upper surface of the base plate. Lock means are provided for securing the first arms in the first extended position. A plurality of second arms are provided such that each second arm has a third end pivotally attached to the second end of a respective one of the first arms and a fourth end and such that each second arm is capable of pivoting between a second extended position wherein the second arm extends upwardly from the first arm and a second retracted position wherein the second arm lies generally flush against the first arm. The lock means for locking the first arms in the first extended position comprises a securement plate that is removably attached to the base plate and partially overlays each of the first arms so as to prevent pivoting of the first arms. Each second arm is pivotally attached to its respective first arm via a bracket that is attached to the first arm. A plurality of lock pins are provided such that each lock pin passes through a respective one of the brackets and its respective second arm in order to prevent the second arm from pivoting and thereby lock the second arm in the second extended position. A flexible cable is attached to each of the second arms proximate each second arm's fourth end. Each first arm is pivotally attached to the upper surface of the base plate via a ring having a plurality of extensions such that each first arm is pivotally attached to a respective one of the extensions. Overall, the second ends of each of the first arms form a generally rectangular shape in plan whenever the first arms are in the first extended position.

BRIEF DESCRIPTION OF THE DRAWINGS

Similar reference numerals refer to similar parts throughout the several views of the drawings.

DESCRIPTION OF THE PREFERRED EMBODIMENT

Figure 1:
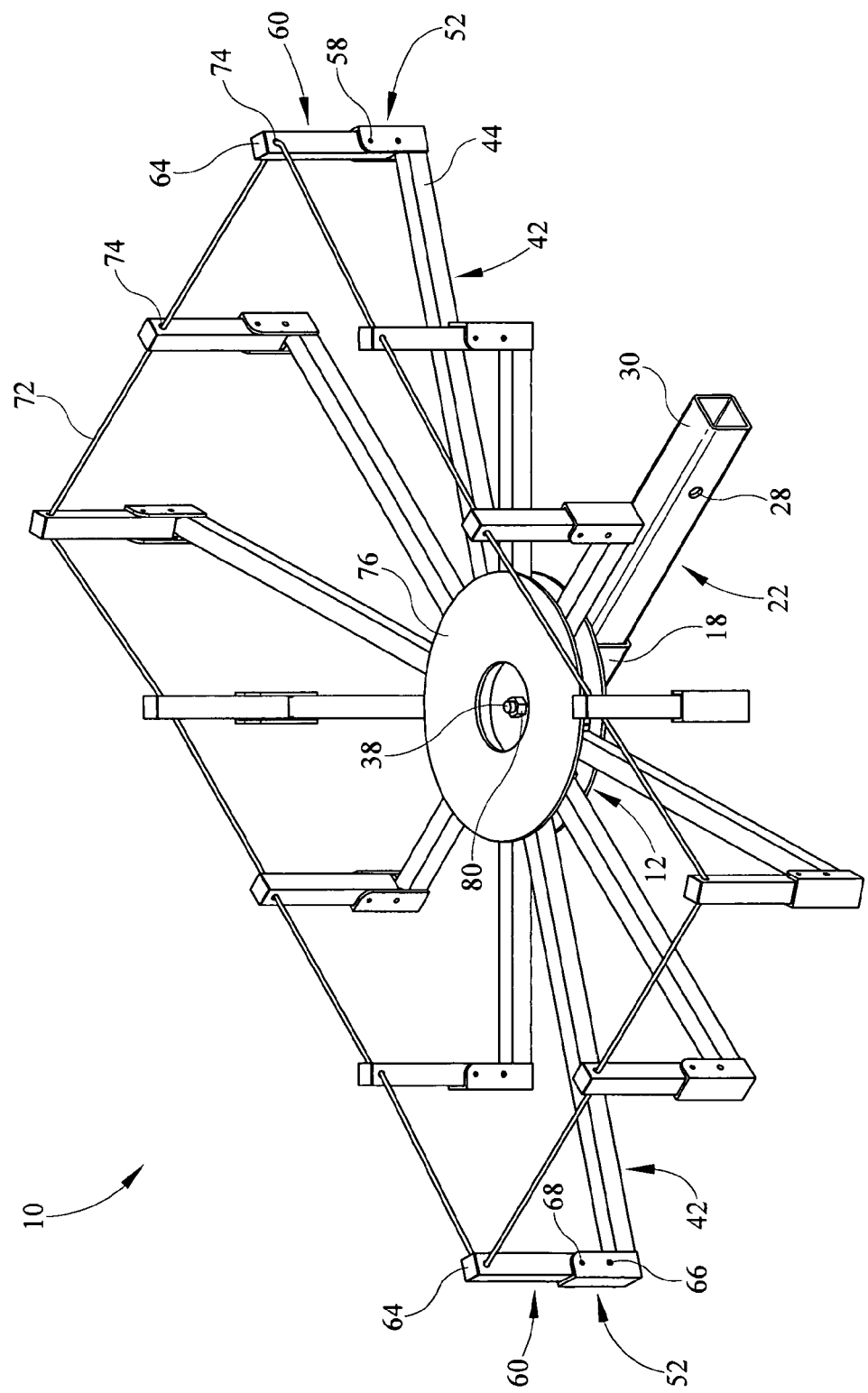
FIG. 1 is a perspective view, from the top, of the collapsible hitch mounted cargo carrier of the present invention in its ready to use configuration.

Referring now to the drawings, it is seen that the collapsible hitch mounted cargo carrier of the present invention, generally denoted by reference numeral 10, is comprised of a base plate 12 having an upper surface 14 and a lower surface 16 that may be braced as seen. Located on the lower surface 16 of the base plate 12 is a receiver 18 that has a pair of corresponding openings 20 located thereon. Removably received within the receiver 18 is a hitch arm 22 that is a hollow tubular member having a generally square cross-section (or other appropriate cross-section to properly mate with a hitch on a vehicle) the hitch arm 22 having a first pair of corresponding openings 24 located on a first end 26 thereof and a second pair of corresponding openings 28 located on a second end 30 thereof. The second end 30 of the hitch arm 22 is received within the open end of the receiver 18 and held therein by passing an appropriate lock pin 32 through the aligned openings 20 on the receiver 18 and the second pair of openings 28 on the second end 30 of the hitch arm 22 in order to lock the hitch arm 22 to the receiver 18. The lock pin 32 may be tethered to an appropriate point on the device 10. If needed, the hitch arm 22 may be telescoping. Additionally, instead of being removably receivable, the hitch arm may be unitary with the receiver 18, however, in such a configuration the hitch mounted cargo carrier 10 is less compact when collapsed for storage. The first end 26 of the hitch arm 22 is removably attached to a square hitch on a vehicle (neither illustrated) in the usual way. The receiver 18 is attached to the base plate 12 in any appropriate fashion such as by welding or by manufacturing the two items in unitary (possibly monolithic) fashion.

Figure 2:
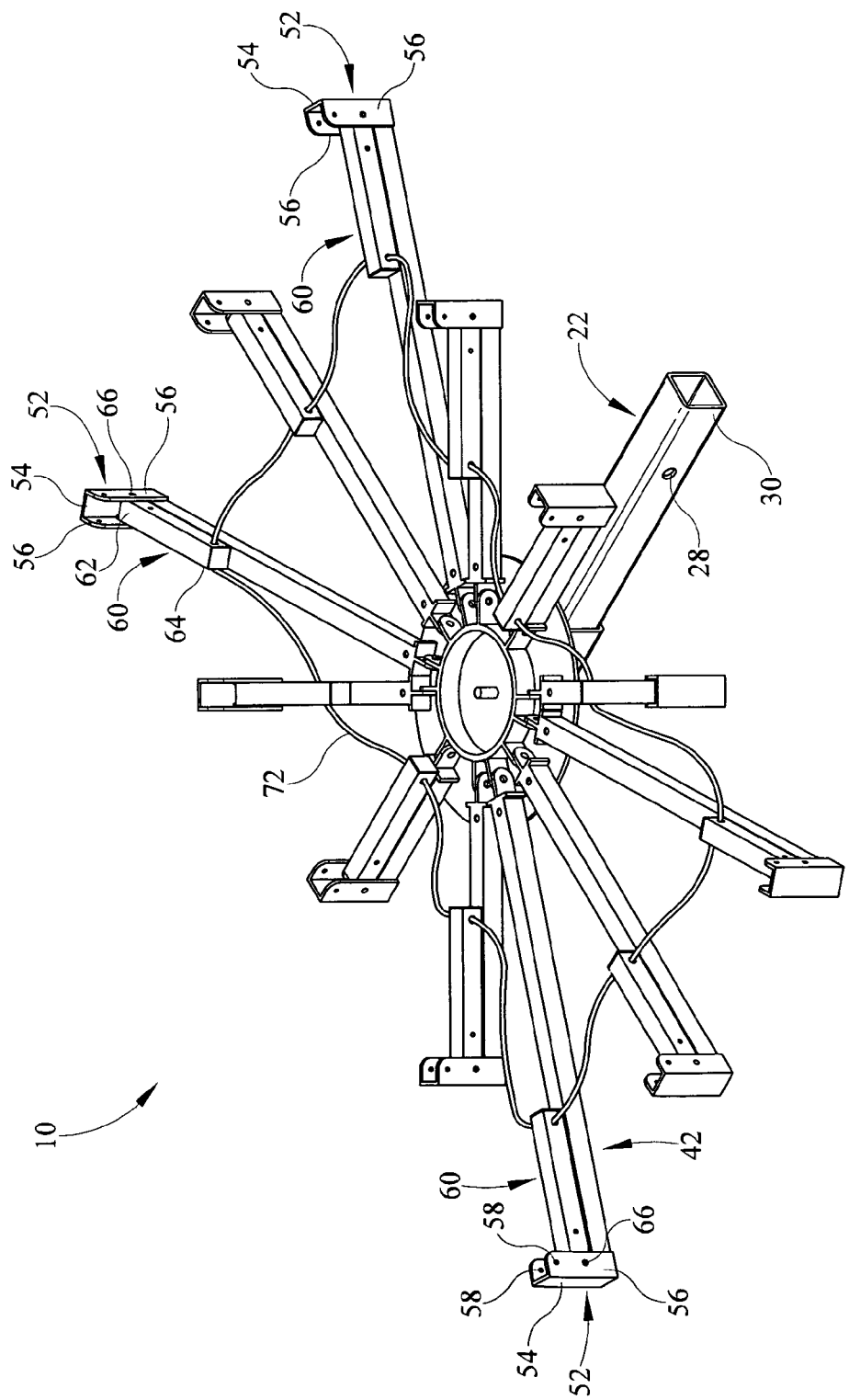
FIG. 2 is a perspective view of the collapsible hitch mounted cargo carrier in a partially collapsed configuration.
Figure 3:
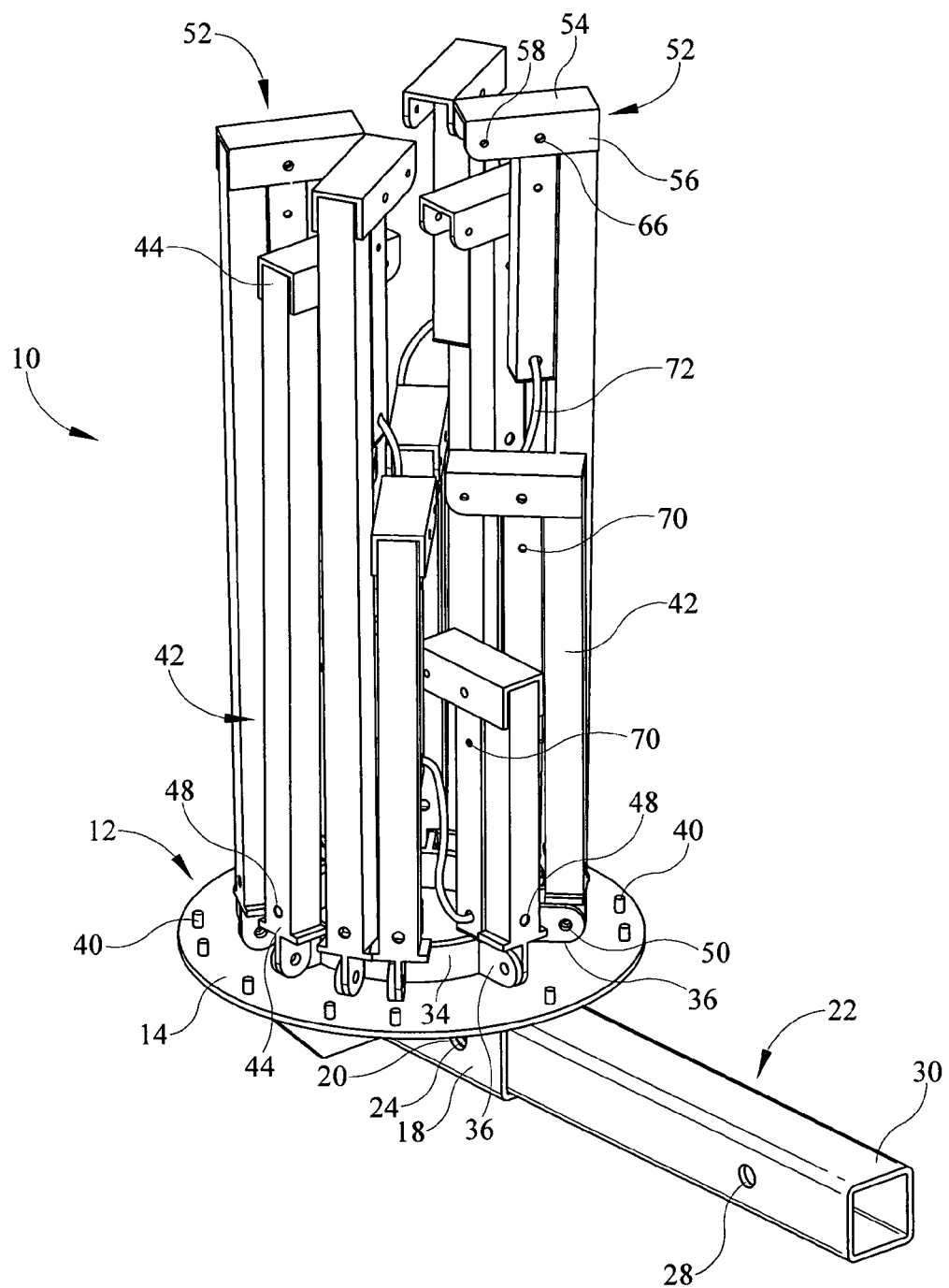
FIG. 3 is a perspective view of the collapsible hitch mounted cargo carrier in a fully collapsed configuration.
Figure 4:
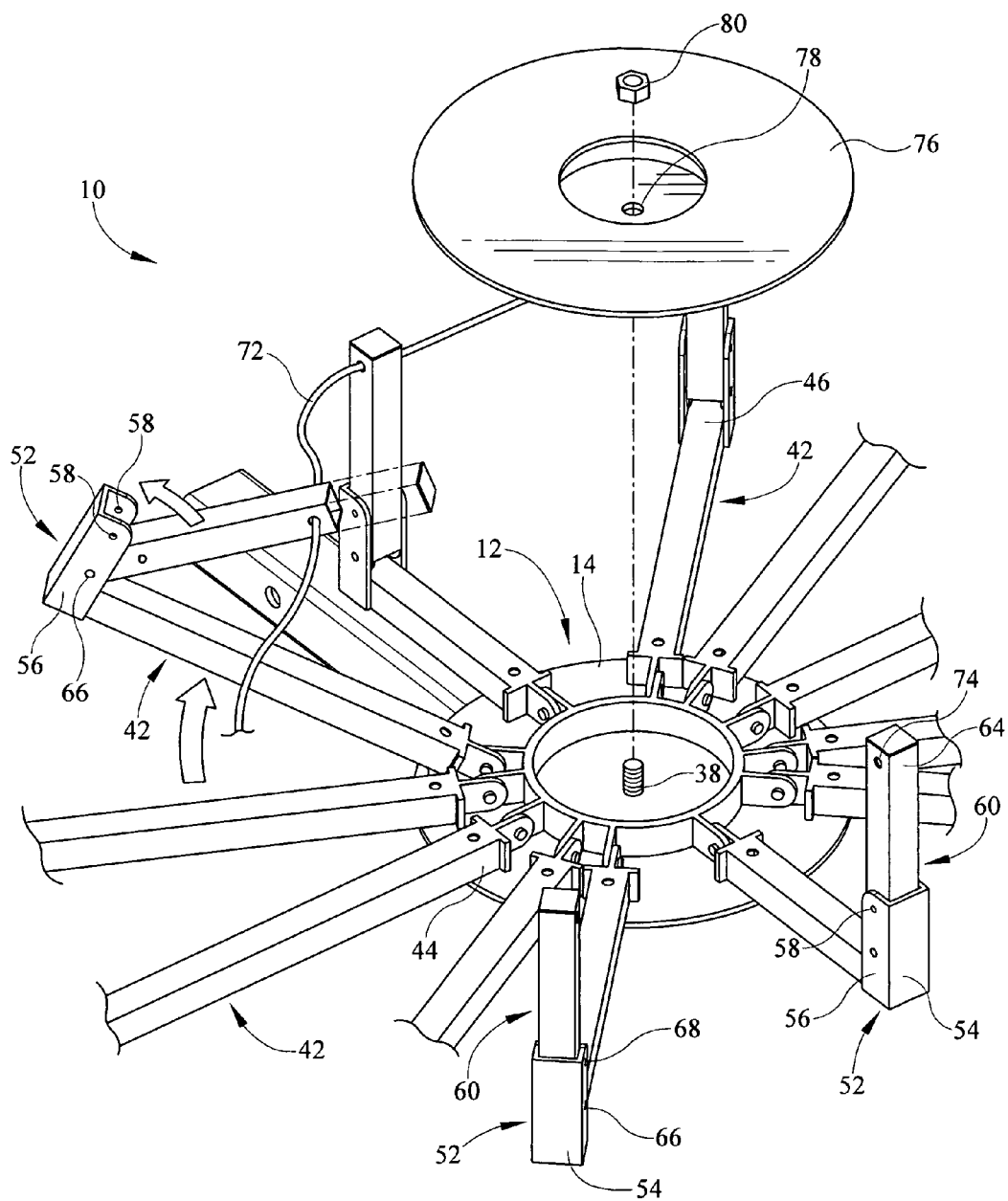
FIG. 4 is a perspective view, partially exploded, of the collapsible hitch mounted cargo carrier illustrating assembly of some of the components.
Figure 5:
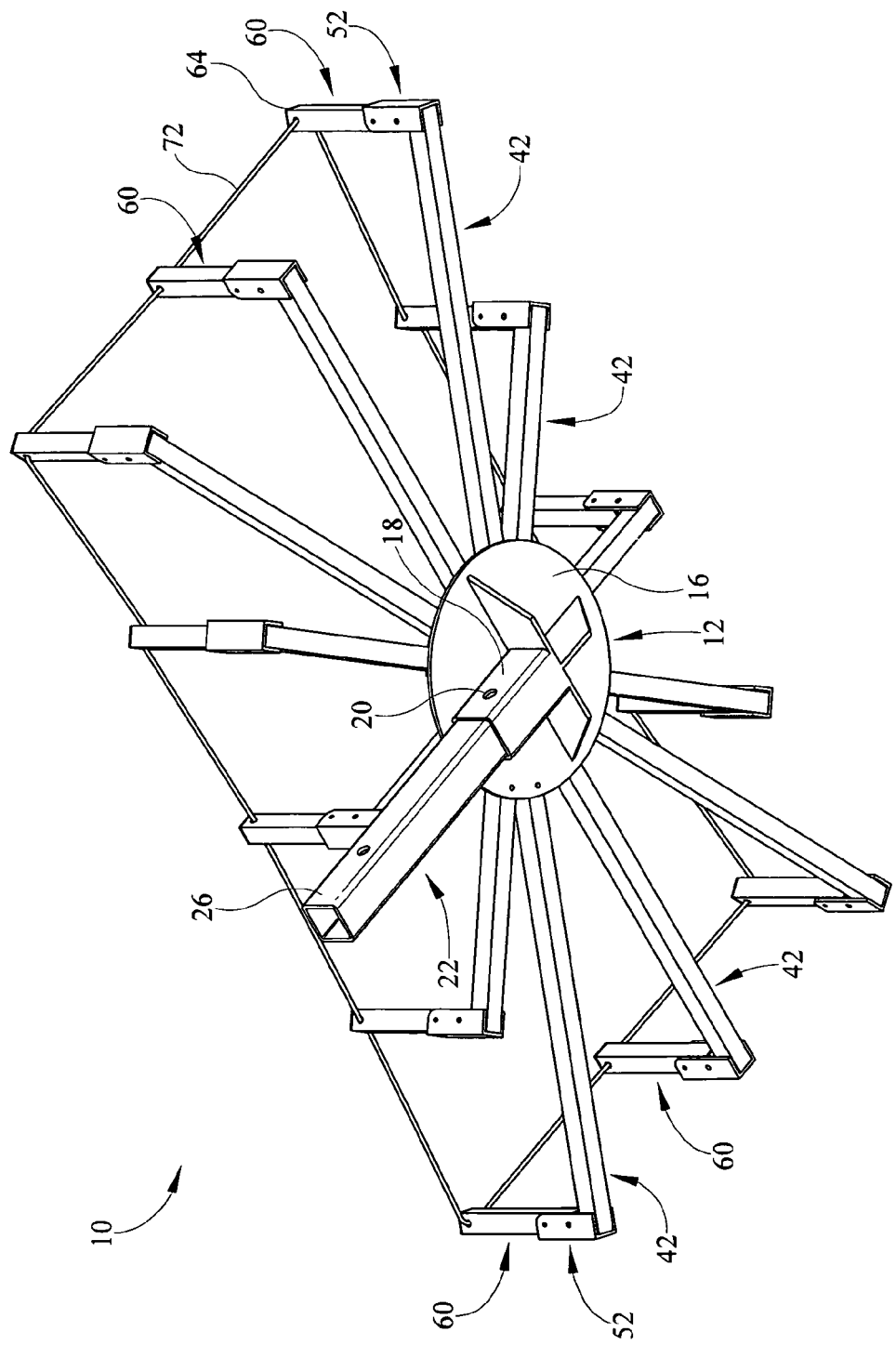
FIG. 5 is a perspective view, from the bottom, of the collapsible hitch mounted cargo carrier in its ready to use configuration.
Figure 6:
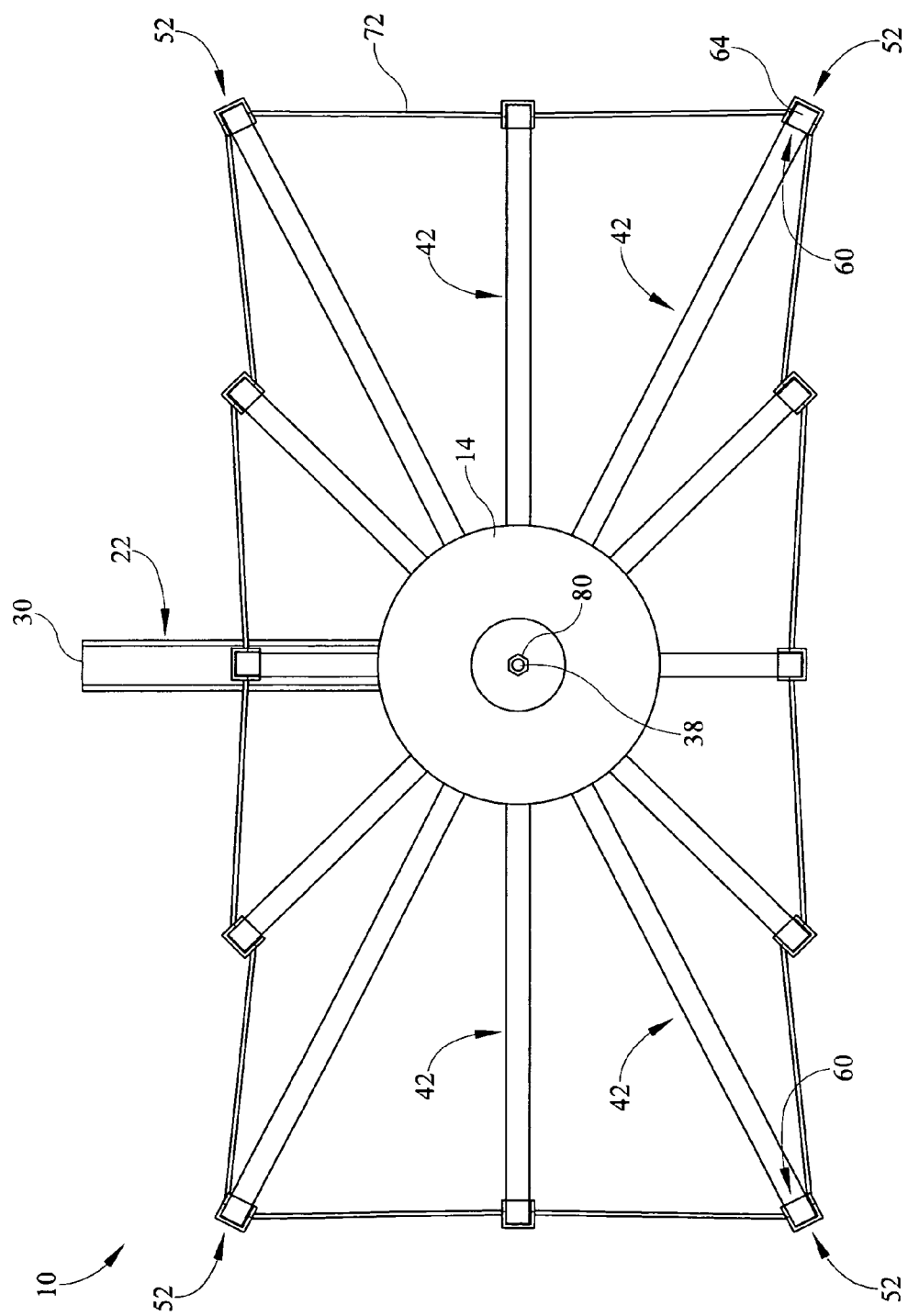
FIG. 6 is a top plan view of the collapsible hitch mounted cargo carrier in its ready to use configuration.
Figure 7:
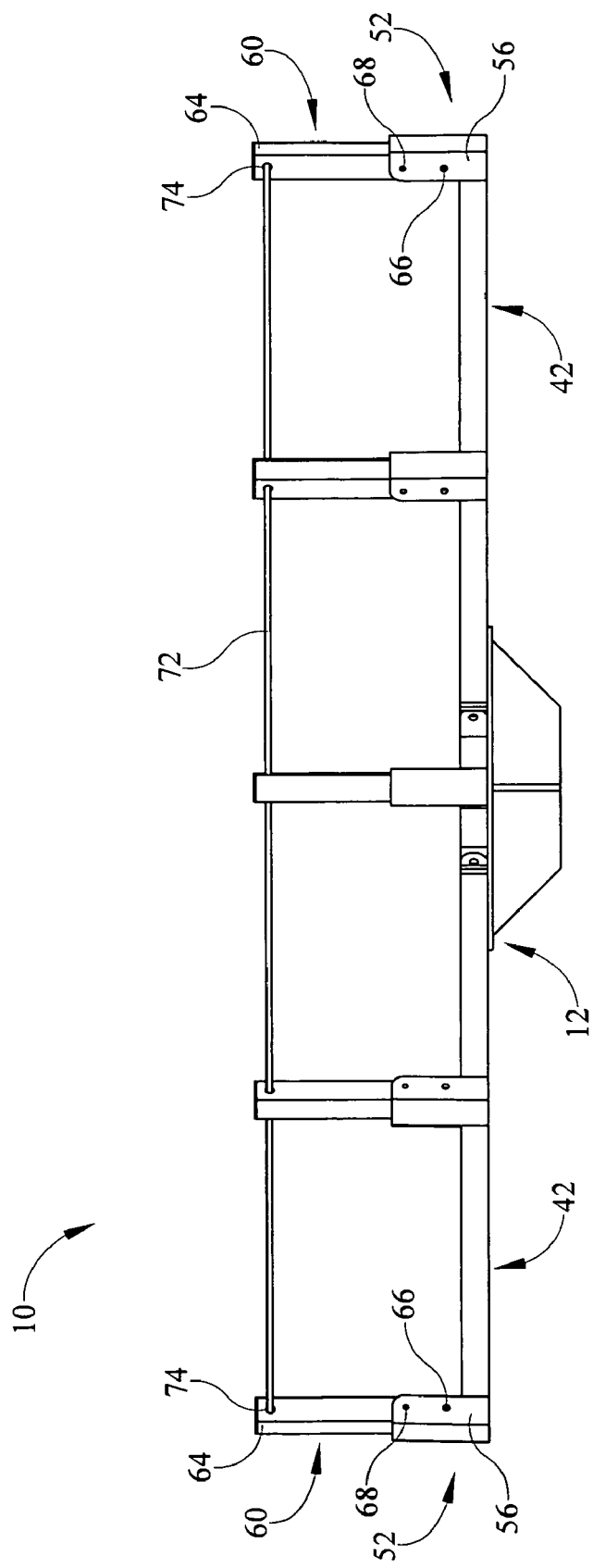
FIG. 7 is a rear elevation view of the collapsible hitch mounted cargo carrier in its ready to use configuration.
Figure 8:
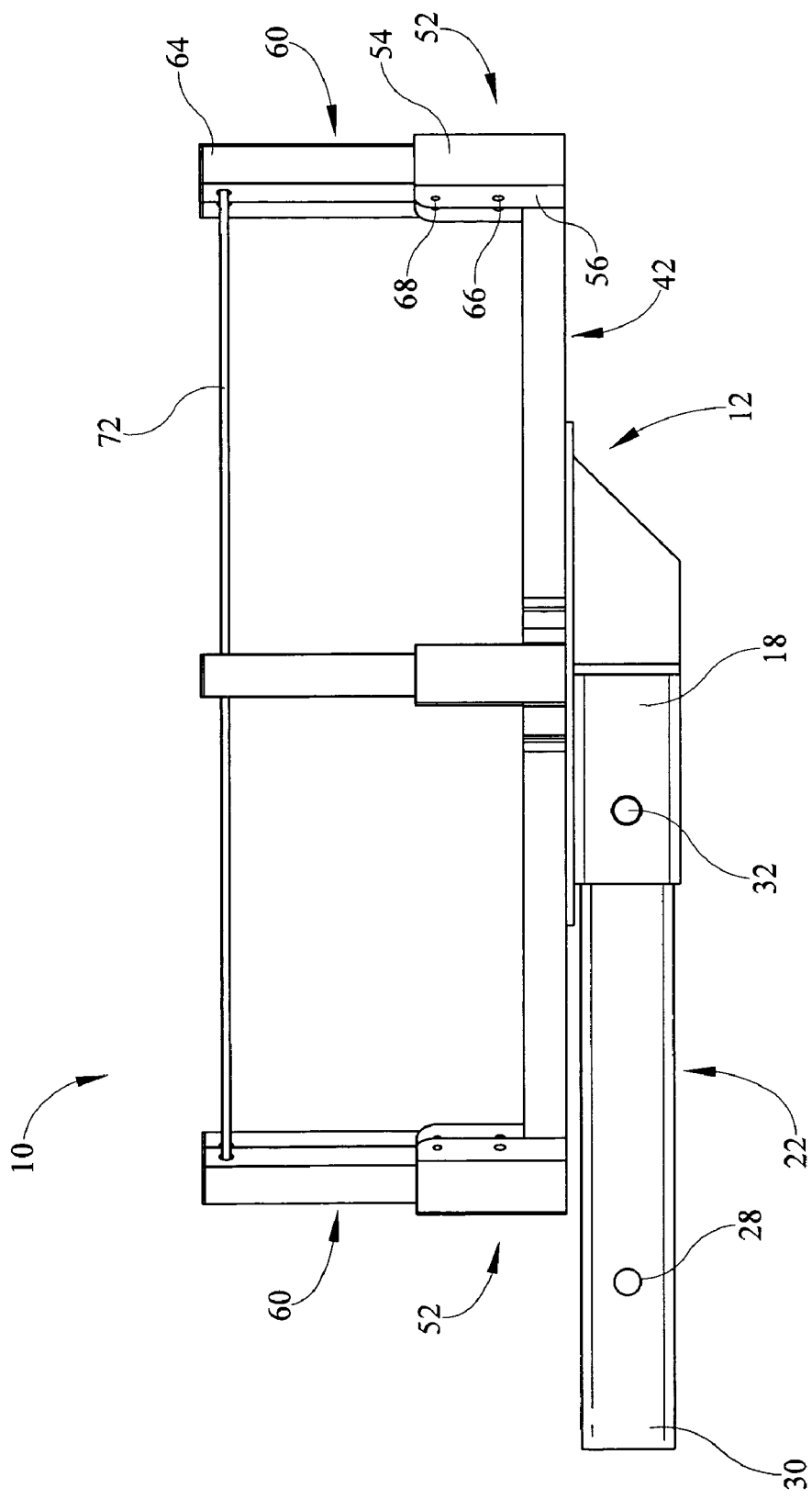
FIG. 8 is a side elevation view of the collapsible hitch mounted cargo carrier in its ready to use configuration.

Located on the upper surface 14 of the base plate 12 is a ring 34 that has a series of extensions 36 extending radially outwardly from the outer surface thereof. Centrally located within the confines of the ring 34 is a threaded pin 38 while a series of securement pins 40 extend upwardly from the upper surface 14 of the base plate 12 proximate the base plate's outer periphery, each securement pin 40 generally radially aligned with one of the extensions 36 of the ring 34. The ring 34 and the threaded pin 38 and the securement pins 40 are attached to the base plate 12 in any appropriate way such as by welding, by manufacturing the units in unitary fashion (possibly monolithically), by passing the pin 38 up through the lower surface 16 of the base plate 12 as a bolt, etc. A first arm 42 is pivotally attached to each extension 36, each first arm 42 having a first end 44 that may be flattened and an opposing second end 46 as well as corresponding openings 48 located on a lower surface and an upper surface of the first arm 42 proximate the first end 44 thereof. Pivotal attachment of each first arm 42 to its respective extension 36 is achieved by passing a pin 50 through corresponding openings located on the extension 36 and the first end 44 of the first arm 42 (neither opening separately illustrated). The various first arms 42 are of differing length although each pair of first arms 42 that is located 180 degrees from one another are each of the same length—however, the device 10 will function properly if each first arm 42 is of the same length. Each first arm 42 is capable of pivoting between an extended position wherein the first arm 42 extends generally outwardly with respect to the upper surface 14 of the base plate 12 as seen in FIGS. 1-2 and 4-8—the longitudinal axis of the first arms 42 being generally normal to the longitudinal axis of the threaded pin 38 and the securement pins 40 and a portion of the lower surface of each first arm 42 resting on the upper surface 14 of the base plate 12 and with the securement pin 40 received within the openings 48 of the respective first arm 42—and a collapsed position wherein the first arm 42 extends generally upwardly with respect to the base plate 12 as seen in FIG. 3—the longitudinal axis of each first arm 42 being generally parallel to the threaded pin 38 and the securement pins 40 and generally normal to the longitudinal axis of the hitch arm 22.

Fixedly attached to the second end 46 of each first arm 42 and extending generally upwardly (normal to the longitudinal axis of the first arm 42) is a bracket 52 that has a back plate 54 and a pair of spaced apart side plates 56 that each overlay a portion of one of the side surfaces of the first arm 42. A pair of corresponding openings 58 is located on the side plates 56, one opening 58 per side plate 56. The bracket 52 is attached to each first arm 42 in any appropriate fashion. A second arm 60 has a third end 62 and an opposing fourth end 64 such that the third end 62 of the second arm 60 is pivotally attached to the second end 46 of the first arm 42 by passing a pin 66 through a pair of corresponding openings on the side plates 56 (below the above-mentioned openings 58 on the side plates 56) and on the second arm 60 (neither opening pair illustrated). The second arm 60 is capable of pivoting between end extended position wherein the second arm 60 extends upwardly from the first arm 42 and has its longitudinal axis in generally normal orientation relative to the longitudinal axis of the first arm 42, as seen in FIGS. 1 and 5-8, and a retracted position wherein the second arm 60 lays generally flush on the upper surface of the first arm 42 and the two arms 42 and 60 have their respective longitudinal axis generally parallel with one another, as seen in FIGS. 2 and 3. When the second arm 60 is in the extended position, the second arm 60 is secured in this position by passing a lock pin 68 through the openings 58 on the side plates 56 and aligned corresponding openings 70 on the second arm 60. These removable lock pins 68 may be tethered to an appropriate point on the device 10. A flexible cable 72 is attached to each second arm 60 proximate the fourth end 64 thereof in appropriate fashion such as by passing the cable 72 through corresponding opening pairs 74 located on each second arm 60.

In order to use the collapsible hitch mounted cargo carrier 10 of the present invention, the hitch arm 22 is received within the receiver 18 and secured thereto via the pin 32. Each first arm 42 is unfolded so as to place the first arms 42 into their extended position. In this position, each securement pin 40 is received within the openings 48 on a respective one first arm 42 in order to help secure the first arm 42 from unnecessary lateral movement. The first arms 42 are held in their extended position by placing a securement plate 76 having a central opening 78 over top the extended first arms 42 such that the threaded pin 38 passes through the central opening 78 of the securement plate 76. The securement plate 76 is held in place by threadably attaching a nut 80 onto the threaded pin 38. The securement plate 76, when threadably secured to the base plate 12, holds the first arms 42 down in their extended position. Each second arm 60 is pivoted into its extended position and locked into the extended position by passing the lock pin 68 through the openings 58 on the side plates 56 and aligned corresponding openings 70 on the second arm 60. The collapsible hitch mounted cargo carrier 10 is fully expanded and ready for use by loading the device 10 with cargo and attaching the second end 26 of the hitch arm 22 to the hitch receiver of the vehicle in the usual way. As seen, when the collapsible hitch mounted cargo carrier 10 is in the fully expanded configuration, the outer periphery formed by the second ends 46 of the first arms 42 is generally rectangular in shape, although a different shape may be made within the scope of the present invention. The lengths of the various first arms 42 are such so as to have the plan of the hitch mounted cargo carrier 10 be in the desired shape.

If desired, one or more additional elements may be attached to the fully expanded collapsible hitch mounted cargo carrier 10 in order to allow the device to hold relatively small items. Such an item can include a relatively flat plate that may be foldable and that is attached to the upper surface of the securement plate 76 (or to the upper surfaces of the first arms 42, making an allowance for the securement plate 76) and secured appropriately so as to give the device 10 a relatively flat solid bottom. Alternately, or in addition, a net member can be appropriately attached to various points of the collapsible hitch mounted cargo carrier 10 so that the inner space bounded by the first arms 42, the second arms 60 and the cable 72 has netting thereat to hold the small items.

When use of the collapsible hitch mounted cargo carrier 10 is not needed, the hitch arm 22 is removed from the hitch receiver of the vehicle and, if desired, also from the receiver 18 on the base plate 12 by removing locking pin 32. Any additional items such as the net member or the plate are removed and stowed. Each lock pin 68 is removed from the openings 58 on the side plates 56 and aligned corresponding openings 70 on the second arm 60 and the second arm 60 is folded into its retracted position generally flush against the first arm 42. The nut 78 is removed from the threaded pin 38 and the securement plate 74 is also removed from the threaded pin 38 and each is stowed. Each first arm 42 is folded into its collapsed position. The collapsible hitch mounted cargo carrier 10 is now collapsed and ready for transport or storage.

While the invention has been particularly shown and described with reference to an embodiment thereof, it will be appreciated by those skilled in the art that various changes in form and detail may be made without departing from the spirit and scope of the invention.

I claim:

1. A carrier comprising:
    a base plate having an upper surface and a lower surface;
    a hitch arm attached to the lower surface of the base plate;
    a plurality of first arms, each first arm having a first end and an opposing second end, the first end of each first arm pivotally attached to the upper surface of the base plate, each first arm capable of pivoting between a first extended position wherein the first arm extends radially outwardly from the base plate and a first collapsed position wherein the first arm extends upwardly from the upper surface of the base plate;
    a securement plate that is removably attached to the base plate and partially overlays each of the first arms and thereby prevents the first arms from pivoting to the first collapsed position; and
    a plurality of second arms, each second arm having a third end pivotally attached to the second end of a respective one of the first arms and a fourth end, such that each second arm is capable of pivoting between a second extended position wherein the second arm extends upwardly from the first arm and a second retracted position wherein the second arm lies generally flush against the first arm.

2. The carrier as in claim 1 wherein each second arm is pivotally attached to its respective first arm via a bracket that is attached to the second end of the first arm.

3. The carrier as in claim 2 further comprising a plurality of pins such that each pin passes through a respective one of the brackets and its respective second arm in order to lock the second arm in the second extended position.

4. The carrier as in claim 3 further comprising a flexible cable attached to each of the second arms proximate each second arm's fourth end.

5. The carrier as in claim 4 wherein each first arm is pivotally attached to the upper surface of the base plate via a ring having a plurality of extensions such that each first arm is pivotally attached to a respective one of the extensions.

6. The carrier as in claim 5 wherein the second ends of each of the first arms form a generally rectangular shape in plan whenever the first arms are in the first extended position.

7. The carrier as in claim 1 wherein each second arm is pivotally attached to its respective first arm via a bracket that is attached to the first arm and each first arm is pivotally attached to the upper surface of the base plate via a ring having a plurality of extensions such that each first arm is pivotally attached to a respective one of the extensions.

8. The carrier as in claim 7 further comprising a plurality of pins such that each pin passes through a respective one of the brackets and its respective second arm in order to lock the second arm in the second extended position.

9. The carrier as in claim 8 further comprising a flexible cable attached to each of the second arms proximate each second arm's fourth end.

10. A carrier comprising:
    a base plate having an upper surface and a lower surface;
    a hitch arm attached to the lower surface of the base plate;
    a plurality of securement pins extending upwardly from the upper surface of the base plate;
    a plurality of first arms, each first arm having a first end and an opposing second end, the first end of each first arm pivotally attached to the upper surface of the base plate, each first arm capable of pivoting between a first extended position wherein the first arm extends radially outwardly from the base plate and where a respective one securement pin is received within at least one opening located on the first arm and a first collapsed position wherein the first arm extends upwardly from the upper surface of the base plate;
    lock means for securing the first arms in the extended position; and
    a plurality of second arms, each second arm having a third end pivotally attached to the second end of a respective one of the first arms and a fourth end, such that each second arm is capable of pivoting between a second extended position wherein the second arm extends upwardly from the first arm and a second retracted position wherein the second arm lies generally flush against the first arm.

11. The carrier as in claim 10 wherein the lock means comprises a securement plate that is removably attached to the base plate and partially overlays each of the first arms and thereby prevents the first arms from pivoting to the first collapsed position.

12. The carrier as in claim 11 wherein each second arm is pivotally attached to its respective first arm via a bracket that is attached to the first arm.

13. The carrier as in claim 12 further comprising a plurality of lock pins such that each lock pin passes through a respective one of the brackets and its respective second arm in order to lock the second arm in the second extended position.

14. The carrier as in claim 13 further comprising a flexible cable attached to each of the second arms proximate each second arm's fourth end.

15. The carrier as in claim 14 wherein each first arm is pivotally attached to the upper surface of the base plate via a ring having a plurality of extensions such that each first arm is pivotally attached to a respective one of the extensions.

16. The carrier as in claim 15 wherein the second ends of each of the first arms form a generally rectangular shape in plan whenever the first arms are in the first extended position.

17. The carrier as in claim 10 wherein each second arm is pivotally attached to its respective first arm via a bracket that is attached to the first arm and each first area is pivotally attached to the upper surface of the base plate via a ring having a plurality of extensions such that each first arm is pivotally attached to a respective one of the extensions.

18. The carrier as in claim 17 further comprising a plurality of pins such that each pin passes through a respective one of the brackets and its respective second arm in order to lock the second arm in the second extended position.

19. The carrier as in claim 18 further comprising a flexible cable attached to each of the second arms proximate each second arm's fourth end.

* * * * *